L. DEGEN.
SIGNAL TRANSMITTING DEVICE.
APPLICATION FILED JAN. 12, 1916.
1,196,732.
Patented Aug. 29, 1916.
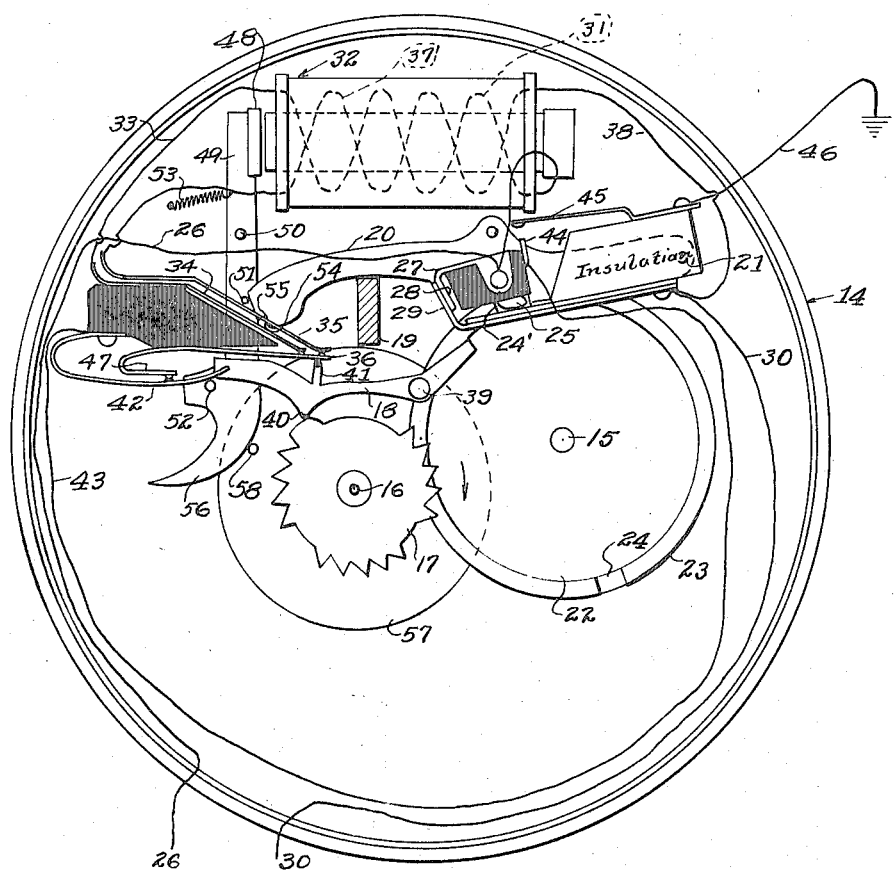
Fig. 2.
Fig. 1.
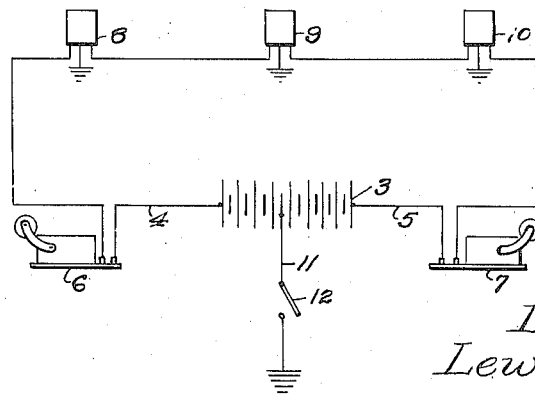
Inventor.
Lewis Degen.
By Edmund A. Strause
Atty.

UNITED STATES PATENT OFFICE.

LEWIS DEGEN, OF LONG BEACH, CALIFORNIA.

SIGNAL-TRANSMITTING DEVICE.

1,196,732.     Specification of Letters Patent.     Patented Aug. 29, 1916.

Application filed January 12, 1916. Serial No. 71,660.

*To all whom it may concern:*

Be it known that I, LEWIS DEGEN, a citizen of the United States, residing at Long Beach, in the county of Los Angeles and State of California, have invented new and useful Improvements in Signal-Transmitting Devices, of which the following is a specification.

This invention relates to signal transmitting devices, and pertains especially to signal transmitting devices which are connected in series with the central station. Such systems are commonly used for fire alarm systems.

This invention consists in improvements in the signaling devices which in the normal operation of the systems transmit signals through a closed metallic circuit, but in case of a break in the circuit, may be operated through the ground and part of the circuit.

In signal transmitting systems of the type above described, a ground connection is made at the box at the same time that the circuit contacts for sending signals are made. The ground connection is normally open, but is closed when the signal transmitting device is actuated for sending in an alarm. In systems employing a plurality of boxes, non-interfering devices are used with each box so that should two or more boxes be operated at the same time, one box will automatically select and transmit its signals without interference from other boxes. If two or more boxes are pulled at about the same time, one box will transmit its round of signals, while each of the other boxes pulled will be grounded through their respective ground connections, but will not transmit signals.

If there is a permanent ground on the line, and a box is pulled, which sends in signals, the pulling of another box which is between the operating box and the ungrounded side thereof will cause a ground to be placed on the line, so that the operating box is between the permanent ground and another ground placed on the line by the second box pulled. This will cut out the operating box and result in a delayed signal. A box which is operating and has control of the line will be cut out by pulling boxes on either side of the operating box as the latter boxes place grounds on the line on both sides of the operating box, and a delayed signal will result. The dangers resulting from the interference with transmission of signals as above described, is especially great in a fire alarm system.

It is the object of my invention to overcome the objections mentioned above by keeping open the ground connection to a box, except when it is in control of the line, and thereby preventing a ground being placed on the line by a box except when that box is in control of the line.

My improved box is so arranged as to operate to ground as well as to make and open the series circuit. Ground connection is made at the same time as the circuit contacts are closed. The ground contact is made when the box is pulled and this connection is maintained until the box has finished sending its complete signal, and opens the connection to the ground when the box is at rest or in its normal condition. A non-interfering device is in the circuit of each box to keep the transmitter off the line when other boxes are sending in signals.

The feature of my invention consists in holding open the ground connection when other boxes are operating the circuit so that should any box or boxes upon the same circuit be pulled they do not put a ground on the circuit until the circuit is in condition to receive the alarm from the box pulled. To that end a second contact is provided in the ground connection, which is controlled by the non-interfering device and makes the ground connection when the box obtains control of the line.

I accomplish these objects by means of the embodiment of my invention illustrated in the accompanying drawing, in which:

Figure 1 is a wiring diagram of a series circuit including fire alarm boxes equipped with my improvement. Fig. 2 is a front view of my improved fire alarm box.

Referring particularly to Fig. 1, the diagram shows a system having a battery of cells 3 to the terminals of which are connected conductors 4 and 5 leading to registers 6 and 7. Fire alarm boxes 8, 9 and 10 are connected in series in the circuit. The center of the battery 3 has a ground branch 11 and a single pole lever switch 12 for connecting the branch 11 to the ground as desired. The battery 3, ground branch 11 and registers 6 and 7 are central station apparatus, and in actual practice more apparatuses than shown are installed at the central station. In some instances the switch 12 is made to operate automatically to connect in the ground. I have however, only shown the essential parts of an operative system. The ground branch 11 may also be connected to one of the terminals of the battery instead of to the center. Such changes in construction are not important as they do not affect my improvement which is applied to the fire alarm box.

Fire alarm boxes 8, 9 and 10 are of a well known type employing a character wheel and brush contacts therefor which are operated by the character wheel to open and close the series circuit and thereby send electrical impulses which actuate instruments at the central station to translate the impulses into perceptible signals. Each box is equipped with a ground branch circuit so that in case of a break on the line the boxes may operate through their ground branch and the ground on the battery. In construction these boxes may be alike, hence the mechanism of only one is shown and described, and this mechanism is shown with part of the frame of the gears and other similar parts which are well understood in the art omitted in order that the essential features may be more clearly shown.

Referring more particularly to Fig. 2, 14 indicates the casing in which the alarm transmitting apparatus is installed. In the box shown a source of power such as a spring acts upon shaft 15 and gearing connecting it with shaft 16, tending to rotate the gears. Upon shaft 16 is mounted a character wheel 17 of the type common in fire alarm systems and having teeth which move a lever 18 and thereby open and close the circuit contacts. A lever which is pulled to set the box in operation is indicated in section at 19, and is so pivoted that the portion underlying a lever 20 is raised upon pulling the box. The lever 20 is pivoted at 21 and controls the opening of a shunt and the movement of the gearing. Upon shaft 15, which at all times tends to rotate, is mounted a wheel 22 provided with a cam 23 which extends laterally from the wheels, is cylindrical in form and provided at diametrically opposite points with slots 24 and 24'. Lever 20 carries a cam follower 25 which is designed to coöperate with the cam 23. The follower 25, when the lever 20 is lifted by the pull lever 19 and wheel 22 rotates, will ride upon the outer peripheral surface of the cam 23, lever 20 being held in its upper position. If free to move downwardly, it will drop to its lower position when follower 25 registers with either slot 24 or 24'.

One side of the line is connected to the conductor 26 which is connected to a metallic member 27 of a shunting switch. Metallic member 27 is fixedly mounted upon the lever 20, insulated therefrom and has a contact tongue 28 arranged to engage a contact tongue 29 fixedly secured to the frame of the transmitting apparatus. When the lever is down in the position shown in Fig. 2 tongues 28 and 29 make contact and current passes from conductor 26 through tongue 28, tongue 29, to conductor 30, which is connected to the other side of the main circuit. Upon lever 19 being pulled, lever 20 is raised and contacts 28 and 29 disengaged from one another, thereby opening the shunt connection and allowing current to pass through the instrument as hereafter described.

Assuming that the shunt is broken at 28 and 29, the box having been pulled, current passes along conductor 26 to metallic member 27 and through one winding 31 of a non-interfering coil designated generally by 32. After passing through the winding 31 the current leaves by the conductor 33 and passes to the circuit contact 34. A complementary circuit contact 35 is so arranged that contacts 34 and 35 may be bridged by a spring contact 36, and is shown bridged in Fig. 2. When bridged as shown, current passes along conductor 35 to the non-interfering coil 32, and through a second winding thereon designated by 37 to a conductor 38 which is connected to conductor 30 and thereby permits current to pass to the other side of the line.

By making and breaking the contacts 34, 35 and 36, electrical impulses are set up in the circuit. The making and breaking of the circuit is accomplished by lever 18 which is pivoted at 39 upon the frame of the device. The lever 18 is provided with a follower 40, so that when the lever is in a position free to move, the follower 40 will ride upon the surface of the character wheel. When it is at the bottom of the teeth the insulated extension 41 on the lever 18 allows the spring contact 36 to move downward and away from the contacts 34 and 35, thereby opening the circuit. When the follower 40 is at the top of the character wheel teeth, the insulated member 41 presses the spring 36 upwardly and closes the circuit by bridging contacts 34 and 35.

Upon pulling the box and opening the shunt, the circuit is grounded. The contact 36 is connected, in the boxes of the type shown as heretofore constructed, directly to a conductor 43, but my improved box is connected thereto through a spring contact 42. Conductor 43 leads to a contact member 44 mounted on the lever 20 and arranged to engage a spring contact 45 connected to a ground wire 46. When lever 20 is raised and the shunt connection broken at 28 and 29, contact 44 engages spring contact 45 and places a ground upon the line at the circuit contacts 34 and 35.

My improvement resides in a second make and break in the grounded branch. In the type of apparatus herein shown, it is embodied in the contacts 42 and 47, the latter being connected to the contact 36 and preferably integral therewith. The contacts 42 and 47 are made and broken by the non-interfering coil mechanism.

Non-interfering coil 32 is provided with an armature 48 which is mounted on a lever 49 pivoted at 50 on the framework. The lever 49 has a pin 51 secured thereto, which extends forwardly and is arranged to be engaged by the end of the lever 20. Mounted on the lever 49 and adjacent its lower end is a pin 52 which is adapted to engage the lever 18. The pin 52 is so disposed with respect to the lever 18 that when armature 48 is held to the coil 32 the end of the lever 18 is out of register with the pin 52 and the lever may drop if the character wheel is disposed so that the bottom of the teeth is below the follower 40. While the lever 49 is held in the position shown in Fig. 2, lever 18 is free to follow the outline of the teeth, oscillate, and open and close the contacts 34 and 35 sending impulses along the line. When lever 18 drops, the end of the lever is disposed at the right hand side of pin 52 and the lever 49 is maintained with its armature 48 against the coil 32. When the lever 18 is in its lower position the circuit is open and no current flows through the coil 32. In this condition a spring 53 which is attached to the lever 49 will pull the latter away from the coil, unless held thereto which is done mechanically by the pin 52 abutting the end of the lever 18. When the lever 18 is in its upper position, the end thereof is moved out of registration with the path of travel of the pin 52 and the spring 53 will pull the lever 49 and the armature 48 away from the coil unless current is flowing through the coil. When the lever 18 is in its upper position, contacts 34 and 35 are closed and the current flows through coil 32. The number of ampere turns on the non-interfering coil 32 is so arranged that the intensity of magnetic field is sufficient to hold the armature 48, but is not sufficient to draw the armature 48 from its farthermost position from the coil, in which position it would be moved by the spring 53. It will also be noted that lever 20 has a cam surface 54 against which the pin 51 may engage when the lever 20 is in its upper position. When lever 20 is in its upper position and cam follower 25 is riding on cam 23, the cam surface 54 is so disposed that the lever 49 may be moved by the spring with the armature 48 away from the coil 32, and the pin 51 will not be obstructed in its movement by lever 20.

Assuming that only one box on the line is being pulled and that is the box shown in Fig. 2, upon raising of lever 19 lever 20 is raised disposing cam follower 25 out of the slot 24'. The wheel 22 is then released and begins to move in a counterclockwise direction; the cam follower 25 resting upon the outer peripheral surface of the cam 23, and holding the lever 20 in its upper position. Character wheel 17 being geared to wheel 22, the latter begins to move in the direction indicated by the arrow holding the lever 18 in its upper position with the contacts 34 and 35 closed. When lever 20 is raised contacts 28 and 29 are broken opening the shunt, so that current now flows through the coil 32, the circuit being closed. The magnetic field generated holds armature 48 against the coil against the action of the spring 53. The end of lever 20 has been raised so that lever 20 does not abut pin 51 to hold the lever 49 in position with the armature against the coil. Pin 52 is so disposed that lever 18 may oscillate up and down. When the lever 18 is in its lower position contacts 34 and 35 are open, current ceases to flow through the non-interfering coil 32, but the armature 48 is retained in position by reason of the end of lever 18 dropping into position to abut pin 52. The character wheel 17 is so geared with respect to the wheel 22 that four revolutions of the character wheel occur during one-half revolution of wheel 22, so that as the slot 24 approaches registration with the follower 25 the character wheel has completed four rounds, thereby sending four complete signals. As the slot 24 reaches registration with the follower 25 the latter drops into the slot stopping the rotation of the gear, allowing lever 20 to drop and the end thereof to abut pin 51, thereby holding the armature 48 against the coil 32. As the lever 20 drops the shunt is again completed through contacts 28 and 29.

If box 9 had been pulled and is sending in signals and box 8 is then pulled the operation of box 8 would be as follows: The circuit contacts in box 9 are opening and closing the circuit, and, therefore, the current does not flow through the circuit continuously, but the circuit is open most of the time during the operation of the box. Upon pulling the box 8, lever 19 lifts lever 20. This disposes the end of lever 20 so that pin 51 is not in engagement therewith, and the lever is free to move. Lever 18 is in the position shown in Fig. 2, and does not abut pin 52 so that it is free to move to the right. Spring 53 tends to pull lever 49 and the armature 48 away from the coil 32. As the circuit is open for the greater portion of the time, the spring will act to pull the armature 48 away from the coil 32, as there is no magnetic field to hold the armature against the coil. The lever 49 in swinging moves pin 52 beneath the end of lever 18, and holds the latter in its upper position so that it cannot oscillate and open the circuit, the circuit being maintained closed by operation of contact 36 engaging contacts 34 and 35.

When box 9 completes its round of signals it closes the circuit and maintains it closed. Current now passes through the coil 32 and the magnetic field generated thereby tends to pull armature 48 over against the coil, but the intensity of field is not great enough to pull the armature from the position it is in. If wheel 22 has completed one-half a revolution during the time box 9 was operating, slot 24 will have moved into registration with follower 25, and the lever would have dropped, stopping the movement of the gearing, but is prevented from doing so by pin 51 on lever 49. Pin 51 has been moved to the right when spring 53 moves lever 49, and is disposed so that lever 20 in dropping would have its shoulder 55 resting upon the pin 51, thereby preventing the movement of lever 20 to its lower position and the follower 25 from completely dropping into the slot 24. The follower 25 does drop a slight distance into slot 24 or 24' as shoulder 55 is disposed above and out of contact with pin 51 when follower 25 is riding on cam 23, but the end of the follower is rounded so that it will ride out of the slot. The gearing under these conditions continues to rotate.

Assuming that box 9 has stopped sending in signals, and the line is closed so that coil 32 is energized, upon slot 24 in cam 23 moving into registration with follower 25, the follower drops partially into the slot and in doing so the cam surface 54 on lever 20 engages the pin 51 moving the lever 49 a very slight distance to the left below the pivot point 50, and thereby moves the tail 56 of lever 49 to the left. Upon shaft 16 is fixedly secured a wheel 57 which has a pin adjacent its periphery indicated by 58. This pin is arranged to engage the surface of tail 56, except when the lever 49 is either against the coil 32 or in its outermost position. If the lever 49 is moved a slight amount from its outermost position the pin 58 as it moves upward will engage the tail 56 and move the lever 49 with armature 48 against the coil, whereupon the magnetic field retains it in position. The movement of lever 49 caused by the dropping of lever 20 is sufficient to throw the tail 56 into the path of pin 58. When lever 49 is in position with the armature 48 away from the coil 32 the tail 56 is moved to the right so that pin 58 will pass to the left of the tail. Lever 49 has a slot at the rear so that pivot pin 58 may pass from the right to the left of the end of the tail and continue its rotation without moving the tail.

It is obvious that as long as box 9 or any other box on the line controls the latter the box 8 when pulled will not go into operation to send signals. The box, however, is actuated and the gearing rotates. As soon as the other boxes controlling the line have released their control, the non-interfering coil 32 is energized and when one of the slots in cam 23 registers with follower 25, lever 20 drops a slight amount moving lever 49 so that tail 56 is in position to be abutted by pin 58. The latter in its rotation moves the lever 49 so that armature 48 comes within the field of the non-interfering coil, in which position it is held by the current flowing, when the line is closed. The lever 18 is then freed by the pin 52 so that it may drop and open the circuit, and when it does so it mechanically holds the lever 49 in position. Signals are now sent in by the box until it has completed its four rounds, whereupon the lever 20 drops and by reason of its end abutting the pin 51 locks the lever 49 with the armature 48 against the coil. The armature is thus left within the field of the non-interfering magnet 32, so that upon pulling the box, if the line is otherwise closed, the box will take immediate control of the line.

When pull lever 19 is operated, lever 20 is raised breaking the shunt connection and at the same time contact 44 is moved against contact 45 closing this break in the ground connection. The ground connection would be immediately made and the ground placed on a box, when the latter is actuated unless another break and make mechanism is placed in the ground branch. The spring contact 42 is arranged to engage the contact 47 and contact 42 extends so that its end is disposed to be engaged by the pin 52 on lever 49. When lever 49 is in the position with armature 48 against the coil 32, pin 52 holds contact 42 against contact 47, thereby making the ground connection. When lever 49 is moved by the spring 53, pin 52 is moved to the right and allows spring contact 42 to move downwardly and away from contact 47 opening the circuit.

It is obvious that when the box is in control of the line, lever 49 is in position with armature 48 against coil 32 maintaining the ground contacts 42 and 47 closed. When the box is actuated and it is not in control of the line, the spring 53 moves lever 49 allowing contact 42 to move away from contact 47 and open the ground circuit so that when the box is actuated by pulling the lever, if it does not control the line, there is a break in the ground connection at contacts 42 and 47, but if it is in control of the line the ground is made through contacts 47 and 42, and 44 and 45, the latter being closed immediately upon actuation of the box.

My improvement may be applied to any box in which a ground is placed on the line and which has a non-interfering mechanism. My invention is not limited to the specific box disclosed herein.

Throughout the claims I have used the word "actuation" in contradistinction to the word operation. The word "actuation" is used herein to mean starting the box so that it will immediately take control of the line and send in signals when the line is free of control by other boxes. The word "operation" is herein used to mean the transmission of signals by the box.

What I claim is:

1. In a series circuit, a signal transmitting device, comprising a signal transmitter, a source of power for actuating said transmitter, a non-interfering device responsive to flow of current in said circuit arranged to control the sending of signals by said transmitter, a grounded branch circuit, a contact for said branch normally breaking the latter, said contact arranged to make said circuit upon actuation of said transmitter, a second contact in said branch for making and breaking the latter, said second contact arranged to be operated by said non-interfering device to make said branch upon the signal transmitting device taking control of the circuit.

2. In a series circuit, a signal transmitting device comprising a signal transmitter, a source of power for actuating said transmitter, shunting means normally shunting said transmitting device and arranged to be opened on actuation of said transmitter, a non-interfering device responsive to flow of current in said circuit arranged to control the sending of signals by said transmitter, a grounded branch circuit, a contact for said branch normally breaking the latter, said contact arranged to be actuated by said shunting means to make said branch upon opening of said shunting means, a second contact in said branch for making and breaking the latter, said second contact arranged to be operated by said non-interfering device to make said branch upon the signal transmitting device taking control of the circuit.

3. In a normally closed series circuit, a signal transmitting device, comprising a circuit make and break signal transmitter, a source of power for actuating said transmitter, a non-interfering coil responsive to flow of current in said circuit, an armature for said coil arranged to control operation of said transmitter, a grounded branch circuit, a contact for said branch normally breaking the latter, said contact arranged to make said branch upon actuation of said transmitter, a second contact in said branch for making and breaking the latter, said second contact arranged to be operated by said non-interfering coil armature, to make said branch upon the signal transmitting device taking control of the circuit.

4. In a normally closed series circuit, a signal transmitting device comprising a circuit make and break signal transmitter, a source of power for actuating said transmitter, a shunting means normally shunting said transmitting device and arranged to be opened upon actuation of said transmitter, a non-interfering coil responsive to flow of current in said circuit, an armature for said coil arranged to control operation of said transmitter, a grounded branch circuit, a contact for said branch normally breaking the latter, said contact arranged to be actuated by said shunting means to make said branch upon opening of said shunting means, a second contact in said branch for making and breaking the latter, said second contact arranged to be operated by said non-interfering coil armature to make said branch upon the signal transmitting device taking control of the circuit.

5. In a normally closed series circuit, a signal transmitting device, comprising a character wheel make and break mechanism, a source of power for actuating said mechanism, a non-interfering coil responsive to flow of current in said circuit, an armature for said coil arranged to control operation of said mechanism, a grounded branch circuit connected to the series circuit at the circuit contacts of said make and break mechanism, a contact for said branch normally breaking the latter, said contact arranged to make said branch upon actuation of said mechanism, a second contact in said branch for making and breaking the latter, said second contact arranged to be operated by said non-interfering coil armature to make said branch upon the signal transmitting device taking control of the circuit.

6. In a normally closed series circuit, a signal transmitting device comprising a character wheel make and break mechanism, a source of power for actuating said mechanism, a shunting means normally shunting said transmitting device and arranged to be opened on actuation of said mechanism, a non-interfering coil responsive to flow of current in said circuit, an armature for said coil arranged to control operation of said mechanism, a grounded branch circuit connected to the series circuit at the circuit contacts on said make and break mechanism, a contact for said branch normally breaking the latter, said contact arranged to be actuated by said shunting means to make said branch upon opening of said shunting means, a second contact in said branch for making and breaking the latter, said second contact arranged to be operated by said non-interfering coil armature to make said break upon the signal transmitting device taking control of the circuit.

In witness that I claim the foregoing I have hereunto subscribed my name this 18th day of December, 1915.

LEWIS DEGEN.